United States Patent Office 2,833,658
Patented May 6, 1958

2,833,658

ORGANOSILICON RELEASE AGENTS

William C. May, Midland, Mich., assignor to Dow Corning Corporation, Midland, Mich., a corporation of Michigan No Drawing. Application May 26, 1955
Serial No. 511,425

1 Claim. (Cl. 106—38.24)

This application relates to novel compositions of matter comprising a dispersing agent and dimethylsilyl esters of certain alkylene glycols.

It has long been known that organosiloxanes, particularly the methylsiloxanes, are excellent release agents in the molding of organic plastics, metals and other materials. The superiority of the methylsiloxanes is evidenced by the fact that they constitute the primary release agent now employed in the rubber industry. However, the molded article carries traces of the organosilicon compound on its surface and this makes subsequent painting of the article difficult or impossible. Furthermore, it is difficult to get bonding agents to adhere to the surface of some plastic articles which have been released from silicon coated molds. As a result, one of the leading automobile manufacturers specifies that no silicone release agent can be used on windshield and door rubber gaskets which are to be manufactured for that company. Likewise, heretofore employed silicone release agents could not be used in many die casting applications because the cast metal article could not be subsequently painted. This difficulty was due to the fact that metal surfaces containing traces of siloxanes are not wet well by organic finishes. As a result of these difficulties there are many release applications where heretofore employed silicones cannot be used.

Another difficulty has been the inherent instability of siloxane mold release emulsions. Although this problem has been greatly reduced in recent years it still presents a significant difficulty in connection with siloxane release agents. Consequently there is great need for a stable, readily dispersible material which even though it may cream after dilution can be readily redispersed with a minimum of effort.

It is the object of this invention to provide novel compositions which may be readily dispersed in water and which serve as excellent release agents while avoiding the difficulty of non-adhesion and non-wettability to paints which have been encountered with the heretofore employed methylsiloxanes. Further objects and advantages will be apparent from the following description.

This invention relates to an emulsifiable composition of matter consisting essentially of from .5–30% by weight of an emulsifying agent of the group cationic, anionic and non-ionic emulsifying agents and from 70–99.5% by weight of a dimethylsilyl ester of a glycol of the group ethylene glycols and propylene glycols, said ester containing from 1–60% by weight based upon the total weight of the ester of dimethylsilyl units calculated as $Me_2Si=$.

The above compositions are easily dispersed by adding them to water and thereafter gently agitating the mixture. The dispersions may be diluted out to any desired extent and are stable for prolonged periods of time in the dilute form. For purposes of release it is preferred that the materials be employed in the form of dilute aqueous suspensions containing from .1–5% by weight of dimethylsilyl ester. However, more concentrated suspensions may be employed if desired.

The compositions of this invention may be prepared by merely mixing the ester and the emulsifying agent in any convenient manner. For the purpose of this invention the emulsifying agent can be of any type, although it is preferred that they be of the non-ionic type.

Specific examples of emulsifying agents which are operative herein are any cationic emulsifying agent such as aliphatic fatty amines and their derivatives such as dodecyl amine acetate, octadecyl amine acetate and acetates of the amines of tallow fatty acids; homologues of aromatic amines having fatty chains such as dodecylanalin; fatty amides derived from aliphatic diamines such as undecylimidazoline; fatty amides derived from disubstituted amines such as oleylaminodiethylamine; derivatives of ethylene diamine; quaternary ammonium compounds such as dioctadecyldimethyl ammonium chloride, didodecyldimethyl ammonium chloride and dihexadecyldimethyl ammonium chloride; amide derivatives of amino alcohols such as β-hydroxyethylstearylamide; amine salts of long chain fatty acids; quaternary ammonium bases derived from fatty amides of di-substituted diamines such as oleylbenzylaminoethylene diethylamine hydrochloride; quaternary ammonium bases of the benzimidazolines such as methylheptadecyl benzimidazol hydrobromide; basic compounds of pyridinium and its derivatives such as cetylpyridinium chloride; sulfonium compounds such as octadecylsulfonium methyl sulfate; quaternary ammonium compounds of betaine such as betaine compounds of diethylamino acetic acid and octadecylchloromethyl ether; urethanes of ethylene diamine such as the condensation products of stearic acid and diethylene triamine; polyethylene diamines; and polypropanol-polyethanol amines.

Suitable non-ionic emulsifying agents are the saponines; condensation products of fatty acids with ethylene oxide such as dodecyl ether of tetraethylene oxide; condensation products of ethylene oxide and sorbitan monolaurate; condensation products of ethylene oxide and sorbitan trioleate and condensation products of phenolic compounds having side chains with ethylene oxide such as condensation products of ethylene oxide with isododecylphenol; and imine derivatives such as polymerized ethylene imine and N-octadecyl-N,N'-ethylene imide.

Sutable anionic emulsifying agents are alkali metal sulforicinates; sulfonated glyceryl esters of fatty acids such as sulfonated monoglycerides of coconut oil acids; salts of sulfonated monovalent alcohol esters such as sodium oleylisethionate; amides of amino sulfonic acids such as the sodium salt of oleyl methyl tauride; sulfonated products of fatty acid nitriles such as palmitonitrile sulfonate; sulfonated aromatic hydrocarbons such as sodium α-naphthalene monosulfonate; condensation products of naphthalene sulfonic acids with formaldehyde; sodium octahydroanthracene sulfonate and alkylarylsulfonates having 1 or several alkyl groups of 8 or less carbon atoms.

The dimethylsilyl esters which are operative in this invention are presumed to be polymeric materials of the basic unit formula

in which ORO represents the glycol residue. These materials can be prepared in a variety of ways, for example, they may be prepared by esterification of dimethylpolysiloxane with an ethylene or a propylene glycol in the presence of an alkaline catalyst and with provision for removal of water as it is formed. Alternatively the esters can be prepared by transesterification of an alkoxy dimethylsilane with an ethylene or a propylene glycol or they may be prepared by the reaction of a dimethyldihalosilane with one or more of the glycols.

The glycols which are used in this invention can be any ethylene glycol such as ethylene glycol, diethylene glycol, tetraethylene glycol or hexaethylene glycol or any propylene glycol such as dipropylene glycol or pentapropylene glycol. Thus the term glycol includes not only the monomeric glycol but also polymeric condensates thereof.

For the purpose of this invention the esters must contain from 1–60% by weight of organosilicon portion calculated as $Me_2Si=$, that is, as a unit weight of 58. When the amount of dimethylsilicon compound is above or below these values the desirable properties of the compounds of this invention are not realized.

The compositions of this invention possess a combination of three desirable properties, namely ease of disperson in water, excellent release of organic plastics and metals and freedom from painting and adhesion difficulties in the molded article. This combination of properties is unique with respect to previously employed siloxane release agents. In employing the compositions of this invention they may be diluted with water as stated above and thereafter applied to the molded surface by any convenient manner such as by brushing, flooding or spraying. The materials give release and freedom from mold build-up which is comparable with straight dimethylsiloxane release agents. When the article has been removed from the mold it can then be easily painted and used in applications which require adhesion of bonding agents.

If desired, the composition may contain rust inhibitors. Preferably these should be compatible with the dimethylsilylester. It has been found that ammonium salts of alkyl acid phosphates act both as dispersing agents and as rust inhibitors.

The following examples are illustrative only and should not be construed as limiting the invention which is properly delineated in the appended claim.

EXAMPLE 1

The dimethylsilyl ester employed in this example was prepared by reacting three mols of dimethyldiethoxysilane with four mols of ethylene glycol until the theoretical amount of ethanol has been removed. The resulting ester contains 40 percent by weight $Me_2Si=$ and 60 percent by weight glycol residue. This ester was a clear fluid which was mixed with the following emulsifying agents in the amounts indicated. In each case the product was readily dispersible in water and gave good release of molded rubber articles and of aluminum die castings. In all cases the molded articles and castings could be satisfactorily painted.

Table

| Emulsifying agent | Percent by wt. emulsifying agent | Percent by wt. dimethylsilyl ester |
|---|---|---|
| Polyethylene glycol monostearate | 15 | 85 |
| Polyethylene glycol monocaprate | 20 | 80 |
| Polyethylene glycol monolinoleate [1] | 20 | 80 |
| Polyethylene glycol monolaurate | 20 | 80 |
| Polyethylene glycol monomyristate | 20 | 80 |
| Polyethylene glycol distearate | 20 | 80 |
| Ammonium salt of alkyl acid phosphate known as Aquarex-L | 15 | 85 |
| $(C_{12}H_{25})(C_{14}H_{29})N\overset{Me_2}{Cl}$ | 15 | 85 |
| Alkyl polyglycol fatty acid ester known as Dergopen-PX | 15 | 85 |
| $C_{18}H_{37}(Me_3)NCl$ | 15 | 85 |
| Sodium salt of alkylarylpolyether sulfate known as Triton W-30 | 15 | 85 |
| Polyalkylene glycol tetradodecylthioether known as Nonic 218 | 15 | 85 |
| Polyoxyethylene sorbitan monooleate known as Tween-80 | 15 | 85 |

[1] This material contained some polyethylene glycol monopalmitate and oleate.

EXAMPLE 2

The ester employed in this example was made by reacting two mols of a polyethylene glycol having an average molecular weight of 400 and 1 mol of dimethyldiethoxysilane until the theoretical amount of ethanol was removed. The resulting ester was divided into two portions and to one was added 1 percent by weight of alkyletherpolyethylene glycol known as Tergitol Nonionic NP-40 and the other portion was mixed with 5 percent by weight of polyoxyethylene sorbitan monooleate known as Tween-80. Both of these mixtures were readily dispersible in water and the dispersons gave satisfactory release for rubber articles. The release articles could be painted with ease.

EXAMPLE 3

Equivalent results are obtained when an ester is prepared from 4 mols of propylene glycol and 3 mols of dimethyldiethoxysilane in accordance with the procedure of Example 1 and the resulting ester is thereafter employed in the procedure of that example.

That which is claimed is:

A method of molding an article which comprises applying to a mold an aqueous dispersion of from .1–5 percent by weight based on the weight of the dispersion of a dimethylsilyl ester of a hydroxy compound selected from the group consisting of ethylene glycols and propylene glycols, said ester containing from 1–60 percent by weight based on the total weight of the ester of dimethylsilyl units calculated as $Me_2Si=$, molding the article in said mold and removing the article therefrom.

References Cited in the file of this patent

UNITED STATES PATENTS

| 2,386,793 | Hanford | Oct. 16, 1945 |
| 2,586,211 | Currie | Feb. 19, 1952 |
| 2,666,685 | Hommel et al. | Jan. 19, 1954 |
| 2,746,982 | Hyde | May 22, 1956 |

OTHER REFERENCES

Thomas: American Leather Chemists Journal, vol. 22 (1927), 204–455 (pp. 181–188).

UNITED STATES PATENT OFFICE
Certificate of Correction

Patent No. 2,833,658                        May 6, 1958

William C. May

It is hereby certified that error appears in the printed specification of the above numbered patent requiring correction and that the said Letters Patent should read as corrected below.

Column 2, lines 63 and 64, the formula should appear as shown below instead of as in the patent—

$$[-\underset{\underset{\text{l}}{\text{SiO}}}{\overset{\text{Me}_3}{}} \text{RO}-]_x$$

Signed and sealed this 22nd day of July 1958.

[SEAL]

Attest:
KARL H. AXLINE,
*Attesting Officer.*

ROBERT C. WATSON,
*Commissioner of Patents.*